United States Patent [19]

Yonemitsu et al.

[11] 3,978,158
[45] Aug. 31, 1976

[54] THERMOPLASTIC RESIN COMPOSITIONS

[75] Inventors: Eiichi Yonemitsu, Kashiwa; Seiichi Kamiyama, Tokyo; Toshiaki Kanada, Tokyo; Takeshi Hattori, Tokyo, all of Japan

[73] Assignee: Mitsubishi Gas Chemical Company, Inc., Tokyo, Japan

[22] Filed: Feb. 26, 1974

[21] Appl. No.: 446,077

[30] Foreign Application Priority Data
Feb. 26, 1973 Japan.............................. 48-22178

[52] U.S. Cl............................... 260/873; 260/869; 260/880 R
[51] Int. Cl.²........................................ C08L 67/06
[58] Field of Search.......... 260/873, 880 R, 45.75 B

[56] References Cited
UNITED STATES PATENTS

| | | | |
|---|---|---|---|
| 3,222,422 | 12/1965 | Cohen | 260/880 R |
| 3,239,582 | 3/1966 | Keskkula et al. | 260/873 |
| 3,403,036 | 9/1968 | Hindersinn et al. | 260/45.75 B |
| 3,852,394 | 12/1974 | Kubota et al. | 260/873 |

*Primary Examiner*—J. Ziegler
*Attorney, Agent, or Firm*—Sughrue, Rothwell, Mion, Zinn and Macpeak

[57] ABSTRACT

A thermoplastic resin composition having excellent mechanical and thermal properties as well as excellent moldability comprising a bis(hydroxyaryl)alkanic polycarbonate and a rubber-modified polychlorostyrenic resin prepared by latex-blending a chlorostyrenic graft polymer latex and a chlorostyrenic copolymer latex.

7 Claims, No Drawings

THERMOPLASTIC RESIN COMPOSITIONS

BACKGROUND OF THE INVENTION

1. Field of the Invention

The present invention relates to a resin composition having excellent properties such as mechanical properties, thermal properties, moldability, etc., and more particularly, it relates to a thermoplastic resin composition having excellent various properties comprising a polycarbonate and a rubber-modified polychlorostyrenic resin.

2. Description of the Prior Art

A bis(hydroxyaryl)alkanic polycarbonate is a thermoplastic resin excellent in mechanical properties, thermal properties, electric properties, etc., and owing to such excellent properties the resin has been widely used as engineering plastics but is inferior in moldability to other ordinary thermoplastic resins owing to its high melt viscosity. For improving these drawbacks a method has been proposed in which the polycarbonate is mixed with a styrenic and/or acrylic resin or a composition thereof having better flow characteristics than polycarbonate as disclosed in, for example, the specification of U.S. Pat. No. 3,239,582. However, although the polycarbonate-containing resin compositions prepared by such methods may have greatly improved flow characteristics and moldability, the essential properties of polycarbonate are degraded and hence such resin compositions are not always preferable for practical use. Therefore, it has keenly been desired to obtain polycarbonate-containing resin compositions having improved moldability without being accompanied by the reduction in the essential properties of polycarbonate by mixing polycarbonate with another resin or resins.

SUMMARY OF THE INVENTION

As the results of various investigations for obtaining polycarbonate-containing resin compositions meeting the aforesaid requirement, the inventors have discovered that the thermoplastic resin composition prepared by mixing a bis(hydroxyaryl)alkanic polycarbonate with a specific rubber-modified polychlorostyrenic resin has improved flow characteristics while retaining the essential properties of polycarbonate, such as excellent mechanical and thermal properties, etc., and hence is quite useful as molding materials for practical use.

That is, according to this invention, there is provided a thermoplastic resin composition comprising (A) a bis(hydroxyaryl)-alkanic polycarbonate and (B) a rubber-modified polychlorostyrenic resin, said resin (B) having been prepared by latex-blending (a) a graft polymer latex and (b) a copolymer latex mainly containing a polymer unit derived from chlorostyrene, and said graft polymer latex having been prepared by emulsion-polymerizing 20 to 70 parts by weight of a vinylic monomer mixture mainly comprising chlorostyrene in a latex containing 30 to 80 parts by weight of a conjugated dienic polymer as a rubber constituent.

DETAILED DESCRIPTION OF THE INVENTION

The inventors have investigated various resins to be blended with polycarbonate for improving the moldability thereof without degrading the essential properties of polycarbonate and have found that the use of a polychlorostyrenic resin mainly comprising chlorostyrene may be preferred in order to obtain a polycarbonate containing resin composition having improved moldability and excellent mechanical property. Furthermore, it has also been found that the resin composition gives molded or fabricated materials having excellent transparency in a specific component ratio. However, the inventors have further found that in such polycarbonate-containing resin compositions, the impact resistance specific to polycarbonate tends to be reduced and hence only the resin composition having a limited component ratio is used or the resin compositions can be used for only limited use. The present invention has been made for overcoming those difficulties and obtaining polycarbonate containing resin compositions having balanced excellent properties which object can be attained by substituting the aforesaid polychlorostyrenic resin with a rubber-modified polychlorostyrenic resin.

It has generally been practiced to modify a resin or a resin composition with rubber for improving the impact resistance thereof, and it is known to blend a polycarbonate-containing resin composition with a rubber-modified styrenic resin or a rubber-modified acrylic resin as described in, for example, the specification of U.S. Pat. No. 3,239,582 mentioned above. In those known resin compositions, it is believed that a rubber-modified resin component prepared by graft-polymerizing a styrenic or acrylic monomer to a rubber constituent by emulsion polymerization is suitable for the purpose. However, in the case of graft-polymerizing chlorostyrene to a rubber constituent, the aforesaid graft polymerization method by emulsification cannot be applied as it is. That is, the inventors have found that chlorostyrene shows a quite high graft reactivity in the case of graft-copolymerizing it to a conjugated dienic rubber and thus when the same graft polymerization method as employed in the aforesaid case of graft-polymerizing a styrenic or acrylic monomer to a rubber constituent is employed in this case, it is difficult to control the extent of the graft-copolymerization or rather the graft-reaction proceeds excessively. After all, in a case of blending a polycarbonate with the rubber-modified polychlorostyrenic resin obtained in the aforesaid method, the rubber-modification effect by incorporating a rubber constituent is reduced to make it difficult to improve the impact resistance as well as only a resin composition having unbalanced properties is obtained. Based on such a knowledge, the inventors have discovered a manner of overcoming those difficulties caused by the graft-reaction specificity of chlorostyrene and succeeded in attaining the present invention by only the use of the rubber-modified polychlorostyrenic resin disclosed in the following description.

As mentioned above, the rubber-modified polychlorostyrenic resin to be incorporated in the thermoplastic resin composition of this invention is a resin obtained by latex-blending (a) a graft polymer latex and (b) a copolymer latex comprising mainly a polymer unit derived from chlorostyrene, said graft polymer latex (a) having been prepared by emulsion-polymerizing 20–70 parts by weight of a vinylic monomers mainly comprising chlorostyrene in a latex containing 80–30 parts by weight of a conjugated dienic polymer as a rubber constituent. That is, by incorporating separately chlorostyrene which is a suitable blending material for polycarbonate into two kinds of a graft copolymer and a random or block copolymer and mixing the both copolymers as latexes thereof, the rubber-modified polychlorostyrenic resin suitable as the blending material for the thermoplastic resin composition of this invention should be obtained.

Also, as mentioned above, the rubber-modified polychlorostyrenic resin contained in the resin composition of this invention contains a polymer structure derived from a conjugated dienic monomer and a polymer structure derived from chlorostyrene but, moreover, it is necessary for improving the dispersibility and miscibility of polycarbonate that the resin has a polymer structure derived from at least one member selected from the group consisting of a vinyl cyanide and an alkyl methacrylate. Typical examples of the above-described vinyl cyanide are acrylonitrile, methacrylonitrile, etc., and a typical example of the alkyl methacrylate is a methacrylic acid ester of an alkyl alcohol having at most 6 carbon atoms. To those vinylic monomers there may further be, if necessary, added styrene, a derivative of styrene such as vinyl toluene and $\alpha$-methylstyrene, or an alkyl acrylate such as methyl acrylate. It is necessary that in the rubber-modified polychlorostyrenic resin a polymer structure derived from a conjugated dienic monomer should be 1 to 15% by weight, a polymer structure derived from chlorostyrene should be 43 to 94% by weight and a polymer structure derived from at least one member selected from the group consisting of a vinyl cyanide and an alkyl methacrylate should be 5 to 25% by weight. The rubber-modified polychlorostyrenic resin having the aforesaid polymer structures is, as mentioned above, prepared by latex-blending the graft polymer latex ($a$) and the copolymer latex ($b$) as mentioned above and the graft polymer latex ($a$) is prepared by emulsion-polymerizing a vinylic monomer mixture, mainly comprising chlorostyrene and containing other vinylic monomers mentioned above, in a latex containing a polymer rubber constituent derived from a conjugated dienic monomer such as butadiene or isoprene. In this case the mixing ratio of the dienic polymer rubber to the vinylic monomer mixture is a range of from 30 to 70 by weight part to 80 to 20 by weight part and it is desired that the latex containing the aforesaid dienic polymer rubber contains the rubber constituent in a comparatively high proportion.

The rubber constituent contained in the rubber-modified polychlorostyrenic resin used in this invention is introduced therein with the above-mentioned graft polymer latex ($a$) and the desired amount thereof is controlled at blending the latex. Since if the content of the rubber constituent is higher than a necessary amount, the effect of improving the melt flow characteristics of polycarbonate becomes less and the contribution thereof to the improvement of the impact resistance of the resin composition product, which is a main object of introducing the rubber constituent, becomes less, it is undesirable that the content of the rubber constituent be over 15% by weight of the rubber-modified polychlorostyrenic resin.

The copolymer latex ($b$) indicated above is a latex of the copolymer (the copolymer is a random or block copolymer and does not include graft-type copolymer) prepared by polymerizing a vinylic monomer mixture, the main of which is chlorostyrene and the remainder is other vinylic monomers mentioned above, by an ordinary emulsion polymerization. The blending ratio of the graft polymer latex ($a$) and the copolymer latex ($b$) may be determined corresponding to the desired composition of the polymer structures in the rubber-modified polychlorostyrenic resin. For separating the aimed rubber-modified polychlorostyrenic resin from a mixture of the latex ($a$) and the latex ($b$), a coagulation method usually used in the production as ABS resins, that is a method in which the system is treated with an acid or multi-charged inorganic salt which acts to coagulate the latex under heating can be properly employed.

The thus obtained rubber-modified polychlorostyrenic resin to be used in the present invention should have a flow characteristic such that the amount of melt flow through a standard nozzle of 1 mm in diameter and 2 mm in length measured at 260°C under a load of 30 kg. using a Koka Flow Tester is from 1 to 500 ($\times$ $10^{-3}$ cc./sec.), preferably from 2 to 200 ($\times$ $10^{-3}$ cc./sec.).

Now, the rubber-modified polychlorostyrenic resin prepared by the above-mentioned manner is mixed with polycarbonate in any desired ratio to provide the thermoplastic resin composition of this invention, which shows excellent balanced various properties according to the mixing ratio of each component. For example, if the content of polycarbonate is predominant, the properties such as moldability and thickness reliance of impact resistance are improved, while if the proportion of the rubber-modified polychlorostyrenic resin is predominant, thermal property and impact resistance of the resin composition are improved. In particular, in the resin compositions having the intermediate range between the both ranges, the balance of the whole properties thereof, such as moldability, thermal property, mechanical property, impact resistance, etc., are harmonized and hence novel thermoplastic resin compositions having preferable properties, which have never been obtained in conventional techniques, are obtained. Usually, in the thermoplastic resin composition of this invention, the proportion of polycarbonate may be 90–20% by weight of the whole amount of the resin composition.

The polycarbonate used in this invention, which should have an intrinsic viscosity in the range from 0.4 to 1.2, preferably 0.5 to 1.0 in methylene chloride at 20°C, may be prepared by reacting a polycarbonate precursor such as phosgene and diaryl carbonate with bis(hydroxyaryl)alkane and a typical example of such polycarbonate is poly(2,2-diphenylpropanecarbonate) derived from bisphenol A.

Also, the term "chlorostyrene" means a nucleus-chlorinated derivative of styrene and the mono-chlorinated derivative of styrene is usually used. In this case, there is no particular restriction about the substituted position of the nucleus.

In the present invention, the polycarbonate may be mixed with the rubber-modified polychlorostyrenic resin by any means usually employed for blending resins. For example, by mixing well the both components mechanically using an extruder, a Bumbury's mixer, a knead roll, etc., the thermoplastic resin composition of this invention can be easily obtained.

In the thermoplastic resin compositions of this invention, various additives usually employed for synthetic resins, such as an antioxidant, a lubricant, a filler, a pigment, etc., may, if necessary, be added thereto.

In the thermoplastic resin compositions of this invention thus prepared, the demerits of polycarbonate about such properties as moldability, thickness reliance of Izod impact strength, elasticity, etc., as well as the demerits of the rubber-modified polychlorostyrenic resin about such properties as thermal property, impact resistance, etc., have been all overcome. After all, it is believed that the resin composition of this invention shows such excellent balanced properties by the contributions of the both resinous constituents of the resin composition.

Furthermore, since the resin composition of this invention has introduced therein the polymer structure derived from chlorostyrene, the self-extinguishing resin composition can be easily obtained by adding thereto a small amount of a flame retarder or by replacing a part of polycarbonate with halogenated polycarbonate.

Then, the excellent features of the resin compositions of this invention will be explained more practically by the following examples, in which all parts and percents are by weight unless otherwise indicated.

EXAMPLE 1 AND COMPARISON EXAMPLE 1.

After diluting 117 parts of a polybutadiene latex (polybutadiene solid content 60%, mean particle size 0.3 micron, and gel content 85%) with 183 parts of water, a mixture of 4.5 parts of acrylonitrile and 25.5 parts of chlorostyrene comprising 65% orthoisomer and 35% para-isomer was added thereto and then after adding further 0.12 part of potassium persulfate, the mixture thus prepared was subjected to a graft polymerization in the emulsified state at 60°C. over a period of 7 hours to provide a latex of the graft polymer.

On the other hand, a mixture of 15 parts of acrylonitrile, 85 parts of chlorostyrene having the same composition as above, and 0.17 part of a modifier, t-dodecylmercaptan was added dropwise and continuously to an aqueous solution prepared by dissolving 2.0 parts of sodium laurylsulfate and 0.4 part of potassium persulfate over a period of 6 hours, whereby the copolymerization was conducted at a copolymerization temperature of 60°C. After the addition of the mixture was over, the copolymerization was further continued for one hour at the same condition to provide a latex of the copolymer.

The graft polymer latex prepared previously was blended with the copolymer latex prepared above so that the solid content of polybutadiene in the blend latex became 15%. Then, by coagulating and separating the latex blend thus prepared, a rubber-modified acrylonitrile-chlorostyrenic resin composition having a flow characteristic of $85 \times 10^{-3}$ cc./sec. at 260°C under a load of 30 kg. was obtained.

The resin composition thus prepared was mixed with the equivalent amount of polycarbonate having an intrinsic viscosity of 0.55 in methylene chloride at 20°C. prepared from bisphenol A 2,2-bis(4-hydroxyphenyl)propane in the pulverized state, and the mixture was melt-kneaded by means of an extruder at a cylinder temperature of 240°C. and extrusion-molded to provide the pellet-shaped resin composition of this invention. From the pellets, a test piece was prepared by injection molding at a cylinder temperature of 250°C. The properties of the test sample were measured, the results of which are shown in Table 1.

In addition, for the sake of comparison, a comparison resin composition was also prepared by the same way as above except that the polybutadiene content in the latex blend was increased to 20% and the results of measuring the comparison sample are also shown in Table 1.

Table 1

|  | (I) | (II) | (III) | (IV) | (V) |
|---|---|---|---|---|---|
| Example 1 | 7.5 | 66 | 39 | 600 | 121 |
| Comparison example 1 | 10.0 | 50 | 40 | 530 | 118 |

Note: (I): Polybutadiene content in the product resin composition by percent; (II): Flow characteristic at 260°C. under a load of 30 kg. ($\times 10^{-3}$ cc./sec.); (III): Izod impact value, using a ¼"-notched bar (kg.cm.cm.); (IV): Tensile strength, (kg./cm.²); (V): Rockwell hardness, (R-scale).

As clear from the above results, the comparison resin composition having the higher rubber content was inferior in almost all properties, in particular, moldability and rigidity and also sufficient results were obtained when the rubber content in the rubber-modified resin was 15%.

COMPARISON EXAMPLE 2

Both of the graft polymer latex and the copolymer latex prepared in Example 1 were individually coagulated. The thus obtained pulver of the graft polymer was mixed with the pulver of the copolymer obtained above so that the solid content of polybutadiene in the mixture became 15%.

By following the same procedure as in Example 1 except that the polymer mixture thus prepared was used in place of the rubber-modified acrylonitrile-chlorostyrenic resin composition obtained by latex-blending method, a polycarbonate containing resin composition was prepared. The properties of the article of the resin composition were as follows:

Flow characteristic (260°C. under a load of 30 kg.): $54 \times 10^{-3}$ cc./sec.

Izod impact value (using a ¼ inch-notched bar): 7 kg.-cm./cm.

Tensile strength: 570 kg./cm.²

EXAMPLE 2

Sample pieces of resin compositions were prepared by the same procedure as in Example 1 while changing the mixing ratio of the polycarbonate and the rubber-modified acrylonitrile-chlorostyrenic resin and the properties of the samples are shown in Table 2.

Table 2

| Blending ratio (%) | | (II) | (III) | (IV) | (VI) |
|---|---|---|---|---|---|
| (A) | (B) | | | | |
| 100 | 0 | 20 | 10 | 680 | 130 |
| 80 | 20 | 44 | 36 | 670 | 118 |
| 60 | 40 | 60 | 37 | 630 | 111 |
| 30 | 70 | 72 | 18 | 540 | 101 |
| 0 | 100 | 85 | 9 | 440 | 93 |

Note: (A): Polycarbonate; (B): Rubber-modified acrylonitrile-chlorostyrenic resin; (II): Flow characteristic at 260°C. under a load of 30 kg., ($\times 10^{-3}$ cc./sec.); (III): Izod impact value, using a ¼"-notched bar (kg.-cm./cm.); (IV): Tensile strength, (kg./cm.²); (VI): Thermal deformation temperature at 18.6 kg./cm.² with no anealing, (°C.).

In addition, the properties of comparison samples consisting of each composition only are shown also in the table. The remarkable improvement in impact resistance proves that the miscibility was good and from the above results it will be clearly understood that the resin compositions of this invention thus prepared had excellent balanced properties.

EXAMPLE 3

A mixture of 20 parts of acrylonitrile, 50 parts of chlorostyrene (ortho-isomer 65% and para-isomer 35%), 30 parts of α-methylstyrene, and 0.30 part of t-dodecylmercaptan was added dropwise and continuously to an aqueous solution prepared by dissolving 2.0 parts of sodium laurylsulfate and 0.4 part of potassium persulfate in 200 parts of water over a period of 6 hours, whereby the copolymerization of the system was conducted at a copolymerization temperature of 60°C. After the addition of the mixture was over, the copolymerization was further continued for 2 hours under the same condition as above to provide a latex of the copolymer.

The copolymer latex thus prepared was blended with the graft polymer latex as used in Example 1 so that the polybutadiene content in the latex blend became 7%. Then, by following same procedure as in Example 1, a rubber-modified acrylonitrile-chlorostyrenic resin composition having a flow characteristics of $8 \times 10^{-3}$ cc./sec. at 260°C. under a load of 30 kg. was prepared.

Then, the rubber-modified resin composition thus prepared was mixed well with the polycarbonate having an intrinsic viscosity of 0.7 in methylene chloride at 20°C. in a mixing ratio of 1 to 1 as in Example 1 to provide the resin composition of this invention. The properties of the article made of the resin composition were measured, the results of which are as follows:

Izod impact value (using a ¼ inch-notched bar): 25 kg.-cm./cm.

Tensile strength: 680 kg./cm.$^2$

Thermal deformation temperature (18.6 kg./cm.$^2$, without annealing): 110°C.

EXAMPLE 4

After diluting 83 parts of polybutadiene latex (same as in Example 1) with 197 parts of water, half the amount of the mixture of 7.5 parts of acrylonitrile, 42.5 parts of chlorostyrene (ortho-isomer 55%, meta-isomer 2%, and para-isomer 43%), and 0.05 part of t-dodecylmercaptan was added to the diluted solution and by adding 0.20 part of potassium persulfate at 60°C., the graft polymerization reaction was intiated. After one hour from the initiation of the reaction, the remaining half of the aforesaid acrylonitrile-chlorostyrene mixture was added dropwise and continuously to the reaction system over a period of 3 hours and thereafter, the reaction was further continued for 3 hours at the same temperature to finish the graft polymerization. Also, an acrylonitrile-chlorostyrene copolymer latex was prepared by the same procedure as in Example 1 except that the isomer composition of chlorostyrene used differed as shown above.

The graft polymer latex and the copolymer latex prepared above were blended each other so that the polybutadiene content in the latex blend became 10% and then the product was coagulated by treating it with a coagulating agent under heating and separated to provide a rubber-modified acrylonitrile-chlorostyrene resin, which had a flow characteristic of $95 \times 10^{-3}$ cc./sec. at 260°C. under a load of 30 kg.

The rubber-modified resin thus prepared was mixed with the polycarbonate as in Example 1 in a mixing ratio of 1 : 1 in powdered states and then the mixture was kneaded and pelletized by means of an extruder at a cylinder temperature of 240°C. From the pellets of the resin composition thus prepared, a molded article was prepared by injection molding at a cylinder temperature of 240°C., the temperature being lower than the case of molding polycarbonate by 40°C. The properties of the product are shown in Table 3 together with the properties of a comparison sample prepared by the following comparison example.

COMPARISON EXAMPLE 3

A resin having the same composition as the rubber-modified acrylonitrile-chlorostyrenic resin as in Example 4 was prepared by an emulsification grafting method under the following conditions and a comparison resin composition was also prepared by the same procedure as in Example 4 except that the resin prepared above was used as a rubber-modified resin. The properties of a molded article of the resin composition are shown in Table 3.

The rubber-modified resin used in the comparison example was prepared as follows: After diluting 16.6 parts of polybutadiene latex same as in Example 1 with 193 parts of water, 2.0 parts of sodium laurylsulfate as an emulsifying agent and 0.36 part of potassium persulfate were added thereto and the mixture was heated to 60°C. Then, a mixture of 13.5 parts of acrylonitrile, 76.5 parts of chlorostyrene, and 0.15 part of t-dodecylmercaptan was added dropwise and continuously to the above-prepared mixture over a period of 5 hours to conduct the graft reaction. After the addition of the mixture was over, the reaction was further continued for 2 hours at the same temperature as above to finish the graft reaction. By treating the latex thus prepared with a coagulating agent, the rubber-modified acrylonitrile-chlorostyrene resin, which had a flow characteristic of $60 \times 10^{-3}$ cc./sec. at 260°C. under a load of 30 kg. was prepared.

Table 3

|  | (I) | (II) | (III) | (IV) |
|---|---|---|---|---|
| Example | 5 | 82 | 32 | 640 |
| Comparison example 3 | 5 | 85 | 14 | 650 |

Note: (I): Polybutadiene content in the product resin composition, (%); (II): Flow characteristic at 260°C. under a load of 30 kg., ($\times 10^{-3}$ cc./sec.); (III): Izod impact value, using a ¼''-notched bar (kg.-cm./cm.); (IV): Tensile strength, (kg./cm.$^2$).

From the above results it will be understood that the resin composition prepared in Example 4 had higher Izod impact value than the resin composition prepared in Comparison example 2 and that the rubber-modified acrylonitrile-chlorostyrenic resin prepared by the manner disclosed in the present invention could give preferable results.

EXAMPLE 5

After diluting 67 parts of polybutadiene latex as in Example 1 with 203 parts of water, half the amount of a mixture of 9.0 parts of acrylonitrile, 51 parts of chlorostyrene (ortho-isomer 65% and para-isomer 35%), and 0.06 part of t-dodecylmercaptan was added to the diluted solution and the mixture was heated at 60°C. Then, by adding 0.24 part of potassium persulfate to the mixture, a graft polymerization reaction was initiated. After one hour from the initiation of the reaction, the remaining half of the aforesaid acrylonitrile-chlorostyrene mixture was added dropwise and continuously and after the addition of the mixture was over, the reaction was further continued for 3 hours at the same temperature to finish the graft polymerization.

On the other hand, a mixture of 10 parts of acrylonitrile, 90 parts of chlorostyrene, and 0.15 part of t-dodecylmercaptan was added dropwise and continuously to an aqueous solution prepared by dissolving 2.0 parts of sodium alkylbenzenesulfonate and 0.4 part of potassium persulfate in 200 parts of water over a period of 6 hours, whereby the copolymerization was conducted at a copolymerization temperaure of 60°C. Thereafter, the copolymerization was further conducted for one hour under the same condition to provide a latex of the copolymer was obtained.

The graft polymer latex and the copolymer latex prepared above were blended each other so that the solid polybutadiene content in the latex blend became 10% and then by coagulating and separating the latex blend, a rubber-modified acrylonitrile-chlorostyrene resin composition having a flow characteristic of 55 × $10^{-3}$ cc./sec. at 260°C. under a load of 30 kg. was prepared.

Then, the resin composition was prepared by the same procedure as in Example 1 except that the rubber-modified resin prepared above was used. The used polycarbonate had an intrinsic viscosity of 0.6 in methylene chloride at 20°C. The properties of the molded article prepared from the resin composition were as follows:

Izod impact value (using ¼ inch-notched bar): 30 kg.-cm./cm.
Tensile strength: 620 kg./cm.$^2$
Thermal deformation temperature (18.6 kg./cm.$^2$, without annealing): 107°C.

EXAMPLE 6

By following the same procedure as in Example 1 except that methyl methacrylate was used in place of acrylonitrile, a resin composition of polycarbonate and a rubber-modified methyl methacrylate-chlorostyrene resin, which had a flow characteristic of 110 × $10^{-3}$ cc./sec. at 260°C. under a load of 30 kg., was prepared. The properties of the article of the resin composition were as follows:

Flow characteristic (260°C. under a load of 30 kg.): 80 × $10^{-3}$ cc./sec.
Izod impact value (using a ¼ inch-notched bar): 28 kg.-cm./cm.
Tensile strength: 580 kg./cm.$^2$
Thermal deformation temperature (18.6 kg./cm.$^2$, without annealing): 103°C.

What is claimed is:

1. A thermoplastic resin composition comprising (A) a bis(hydroxyaryl)alkanic polycarbonate and (B) a rubber-modified polychlorostyrenic resin; said resin (B) having been prepared by latex-blending (a) a graft polymer latex having been prepared by emulsion-polymerizing (a) 20 to 70 parts by weight of a vinylic monomer mixture comprising mainly chlorostyrene and further a vinyl cyanide in the presence of (b) 80 to 30 parts by weight of a rubber constituent derived from a conjugated dienic monomer, and (2) a copolymer latex having been prepared by emulsion-polymerizing a vinylic monomer mixture comprising mainly chlorostyrene and a vinyl cyanide; said resin (B) containing 1 to 15% by weight polymer structure derived from conjugated dienic monomer (b), 43 to 94% by weight polymer structure derived from chlorostyrene and 5 to 25% by weight polymer structure derived from a vinyl cyanide.

2. The thermoplastic resin composition as claimed in claim 1 wherein said vinyl cyanide is acrylonitrile or methacrylonitrile.

3. The thermoplastic resin composition as claimed in claim 1 wherein added to said vinylic monomer mixture (a) is at least one member selected from the group consisting of styrene, α-methyl styrene, vinyl toluene and an alkyl acrylate.

4. The thermoplastic resin composition as claimed in claim 1 wherein said 80 to 30 parts by weight of a rubber constituent derived from a conjugated diene monomer (b) is selected from the group consisting of polybutadiene and polyisoprene.

5. The thermoplastic resin composition as claimed in claim 1 wherein said rubber-modified polychlorostyrenic resin (B) has a flow characteristic of 1 to 500 × $10^{-3}$ cc./sec. at 260°C. under a load of 30 kg. through a nozzle of 1 mm in diameter and 2 mm in length using a Koka Flow Tester.

6. The thermoplastic resin composition as claimed in claim 1, wherein said composition consists of the components (A) and (B).

7. The thermoplastic resin composition as claimed in claim 1, wherein said bis(hydroxyaryl)alkanic polycarbonate (A) is used in an amount of 90–20% by weight of the weight of the total resin composition.

* * * * *